March 27, 1945.  S. DAWSON  2,372,363
BURNER CONSTRUCTION FOR COOKERS
Filed Aug. 21, 1941  3 Sheets-Sheet 1

INVENTOR.
Sidney Dawson
BY Clarence E. Threedy
HIS ATTORNEY

March 27, 1945. S. DAWSON 2,372,363
BURNER CONSTRUCTION FOR COOKERS
Filed Aug. 21, 1941 3 Sheets-Sheet 2

INVENTOR.
Sidney Dawson
By Clarence E. Threedy
HIS ATTORNEY.

March 27, 1945.    S. DAWSON    2,372,363
BURNER CONSTRUCTION FOR COOKERS
Filed Aug. 21, 1941    3 Sheets-Sheet 3
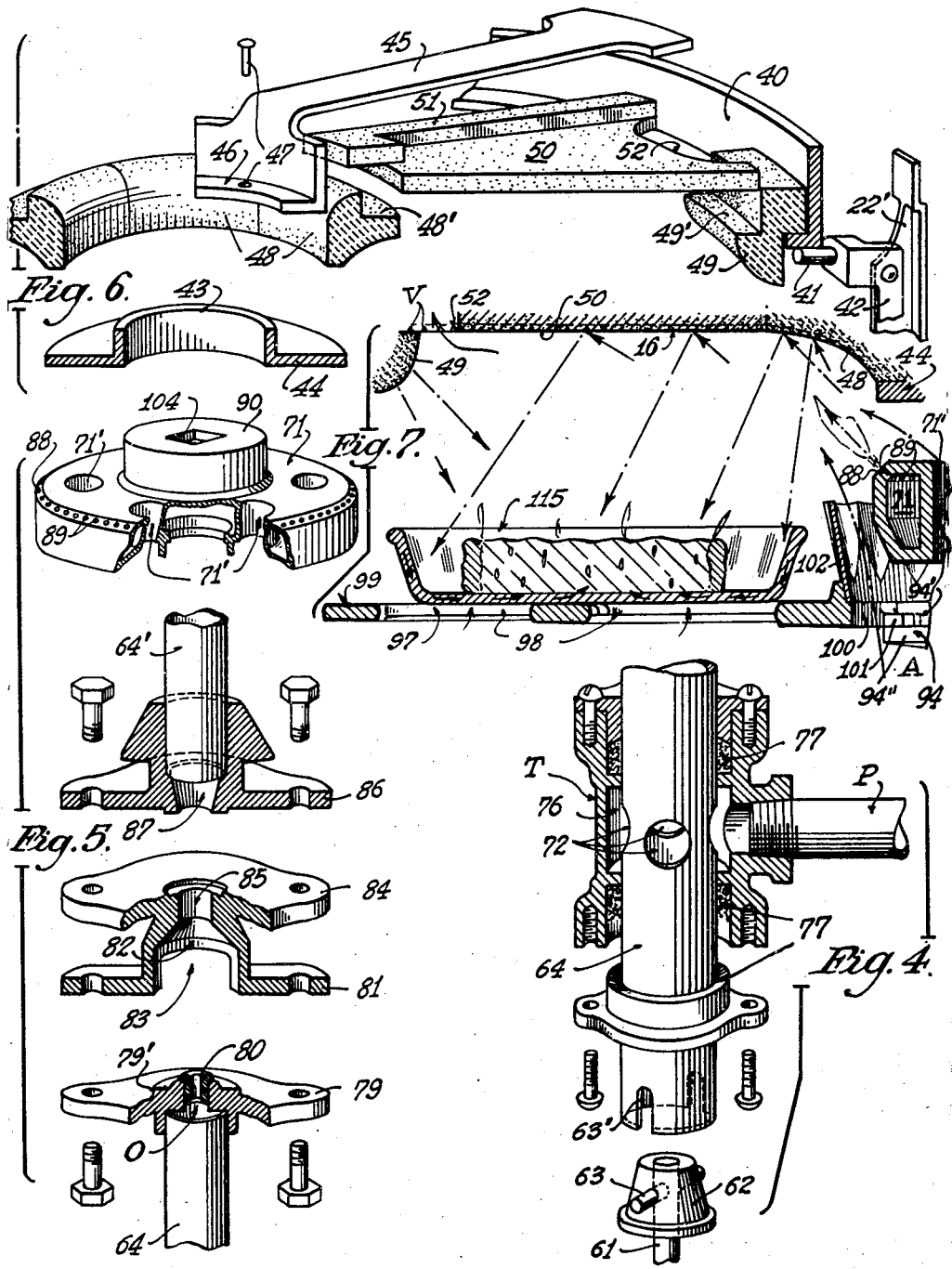
INVENTOR.
Sidney Dawson
BY Clarence E. Threedy
HIS ATTORNEY Patented Mar. 27, 1945

2,372,363

UNITED STATES PATENT OFFICE 2,372,363

BURNER CONSTRUCTION FOR COOKERS

Sidney Dawson, Chicago, Ill., assignor to Richard Groetchen, Chicago, Ill.

Application August 21, 1941, Serial No. 407,749

4 Claims. (Cl. 126—39)

This invention relates to burner structures for cooking implements and has for its principal object the provision of a burner structure which will be economical in manufacture, simple in construction and highly efficient in use.

Another object of this invention is to provide a burner assembly which forms a part of a drive means for an ambulatory cooking device.

Still another object of this invention is to provide a burner structure having a novel arrangement of parts which may be detached from the cooking device in a simple manner.

A further object of my present invention is to provide a rotary cooker with a central burner which will rotate with the substance being cooked and simultaneously form a drive means for rotating the cooking grilles.

Other objects and novel aspects of my invention including certain advantages of structure and operation will be more fully set forth in the specification in view of the drawings in which:

Fig. 2 is a horizontal sectional detail plan view through the burner chamber;

Fig. 3 is a horizontal section partly in plan through the utility chamber housing the burner control;

Fig. 4 is a fragmentary perspective view, partly in section, and showing the assembly of the rotary burner unit with a fixed fuel supply;

Fig. 5 is an exploded perspective view, partly in section, illustrative of the burner assembly and its detachable character;

Fig. 6 is an exploded perspective view, partly in section, of a heat reflecting partition adapted to be associated with the rotary burner;

Fig. 7 is an enlarged fragmentary sectional detail taken through one radial portion of the rotary cooker, substantially as seen in Fig. 1, illustrating the trajectory of heat in the cooker; and Fig. 8 is an exploded fragmentary perspective view illustrating the assembly of a grille disc on a common drive shaft.

Figure 1:
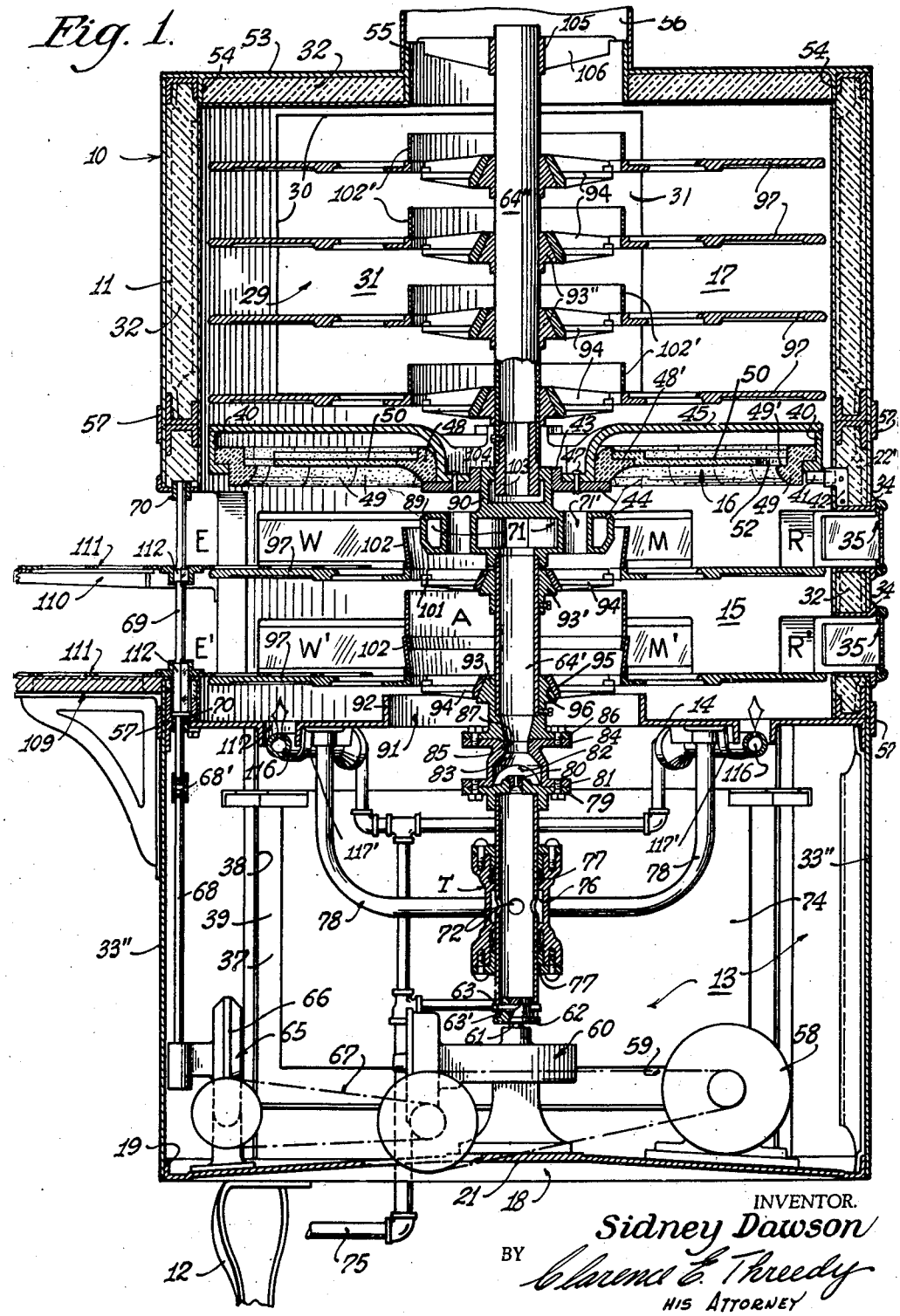
Fig. 1 is a vertical sectional detail through a rotary cooker embodying my new burner structure.

The present invention is shown embodied in a rotary cooker having a housing 10 of cylindrical form and divided into three main sections. The cooker structure forms the basis of my copending application Serial No. 407,748, filed concurrently herewith and will only be referred to insofar as is necessary to a full understanding of the rotary burner structure of this present application.

The housing 10 provides a utility chamber 13 shown in Fig. 3 having a top wall 14 which comprises a lower wall for a cooking and broiling chamber 15 shown in plan view in Fig. 2 above which is arranged a heat reflector 16 of refractory material to form a dividing line between the broiler chamber and a chamber 17 which comprises a preheating chamber.

The casing of the housing 10 is built upon a bottom frame 18 (Fig. 3) supported on the legs 12 and having an annular flanged ring 19 with radially arranged cross bracing 20 formed integrally at their point of convergence with a web 21 extending diametrically across the frame 18 to provide a support for certain drive means later to be explained. The outside wall 11 of the housing 10 is suitably supported upon the frame 18 and is provided in the region of the broiler chamber 15 and the preheating chamber 17 with an insulating material 32.

A suitable door frame 30 is provided for an opening 29 providing access to the preheating chamber 17 and a door 31 is hingedly mounted on the frame 30 to provide a closure for the opening 29. The broiler chamber 15 is likewise provided with a series of openings best illustrated in Figs. 1 and 2 wherein it will be seen that there are a pair of openings disposed one above another, the upper ones being indicated as R, M, W and E and the lower ones indicated as R', M', W', and E' respectively. Each of the openings R, M, W and R', M', W' is provided with a suitable frame 34 adapted to hingedly support a door 35 having a glass panel through which the interior of the chamber 15 is visible. The openings E and E' have one common frame 36 for reasons hereinafter to be explained.

The utility compartment 13 is merely covered by an outside panel 33'' and is provided with an opening 37 having a frame 38 for hingedly supporting a door 39.

As was hereinbefore stated the chambers 15 and 17 are divided by a heat reflecting partition 16, the construction of which will now be explained. Reference being had to Figs. 1 and 7, a flanged ring 40 is arranged on a three point support in the form of radially extending pins 41 carried by brackets 42 in turn fixed to strut members 22' at desired positions, as shown in Fig. 7. An inner ring 43 having a flared disc flange 44 is supported concentrically of the ring 40 by means of radially extending brackets 45 having their segmental and depressed inner ends 46 attached as at 47 to the disc 44 to allow a partial extension thereof beyond the ends 46, the outer ends of these brackets 45 lying on top of the upstanding ring 40 and preferably, though not necessarily, fixed thereto by brazing or bolting.

The foregoing constitutes a supporting frame for the refractory material 16 which is made up of an annular row of blocks of refractory material arranged on the horizontal flange of the inner ring 43 and also one on the horizontal flange of the ring 40 to provide an inner and an outer supporting ring, the first of which comprises a plurality of arcuate segments 48 having a supporting ledge 48' and the second of which likewise comprises a plurality of segments 49 conforming to the arch of the ring 40 and having a supporting ledge 49'. Spanning the ledges 48' and 49' are a plurality of slabs 50 in segmental form having an overlapping projection 51 adapted to overlie the abutting joint between adjacent slabs, each slab having a concavity 52 formed at its outer peripheral edge having a bypass for hot air circulation as will appear more readily hereinafter.

To complete the casing 11 there is provided a top frame 53 having an annular flange 54 which is adapted to fit down over the upper edge of the cylindrical wall of the preheating chamber 17 to close the upper end thereof and to provide a centrally located collar 55 upon which may be arranged a stack or flue 56 to conduct fumes and exhaust hot air away from the cooker. This frame has an insulation material 32 arranged between its interior and exterior metal panel and is removable as a unit from its inserted relation with respect to the cylindrical wall. Trim bands 57 surround the casing 11 at the dividing lines of the several compartments and to otherwise give the outer casing a neat and pleasing appearance.

Having thus described the casing 11, I shall now explain the embodiment of the utility compartment (reference being had to Figs. 1 and 3) the main purpose of which is to house the various control instrumentalities including a drive means consisting of an electric motor 58 supported on the web 21 and having drive connection through the medium of a belt and pulley attachment 59 with a speed reducing unit 60. This latter unit 60 is fixed to the web 21 and includes a gear mechanism (not shown) from which extends a drive shaft 61 coaxially arranged with respect to the cylindrical casing 11. The shaft 61 carries for rotation therewith a coupling block 62 having a radially extending pin 63 adapted to fit into slots 63' formed in a tubular shaft 64 to drivingly connect the shaft 61 to the tubular shaft 64 (see Fig. 4) so as to rotate the latter and parts connected thereto.

An auxiliary drive mechanism is generally indicated at 65 and includes a speed reducing gear housing 66 having belt and pulley connection 67 with the main power takeoff 59. The housing 66 is mounted on the web 21 and provides a vertically extending drive shaft 68 adapted to be coupled as at 68' to a drive shaft 69 mounted for rotatable movement in aligned bushings 70 arranged in the framework of the casing wall at the openings E and E' for purpose of driving an ejector means later to be referred to.

Having thus described the environment best adapted for the employment of my new burner structure I shall now proceed to explain the novel and pertinent characteristics of such burner structure forming the subject matter of my present invention.

The tubular shaft 64 heretofore mentioned in addition to being a rotatable shaft is also a conduit through which fuel gas is supplied to a main burner 71. The supply of fuel gas enters the shaft 64 through ports 72 formed in its midsection whereat there is arranged a T connection which permits rotative movement of the shaft 64 and at the same time assures a constant flow of fuel from a fixed source of supply. This T connection is threadably connected to a pipe length P having a cock valve 73 arranged on an instrument panel 74 fixedly supported within the utility compartment 13 and having its control side accessible through the door opening 37. The valve 73 controls the fuel flowage from a supply pipe 75. The T connection provides a cylindrical chamber 76 around the tubular shaft 64 in the region of the ports 72 and is provided with a packing sleeve 77 at each end, coaxially with the shaft 64 to provide an adequate seal under normal gas pressure. This T connection is supported in its vertical position by a pipe bracket 78 suspended from the under side of the partition 14 and carrying the pipe length P just adjacent its point of entry into the T connection.

The upper end of the tubular shaft 64 has brazed thereon a flange element 79 best illustrated in Fig. 5. An opening O is formed in this flange 79 coaxially with the shaft 64 and arranged in this opening O is a bushing having a relatively small orifice 80 formed therein. This orifice flange 79 has a raised shoulder formation 79' upon which is mounted by suitable stud bolts, the lower flange 81 of a double flanged casting comprising a mixing chamber 82, there being a pair of openings 83 formed in the side walls of this mixing chamber 82 adjacent the orifice 80. The mixing chamber 82 is restricted immediately above the openings 83 to form a Venturi tube 85 adjacent the upper flange 84 on the double flanged casting, in which Venturi tube 85 the fuel gas emitting from the orifice 80 and the air entering the openings 83 are properly combined to render such mixture combustible. A third flanged casting 86 is arranged above the two foregoing flanged elements and is adapted to be bolted onto the flange 84 coaxially therewith. This casting has a flared opening 87 formed therein forming an exit from the Venturi tube 85 and adapted to convey the mixed fuel emitting therefrom into a tubular shaft 64' forming an extension of the shaft 64. The upper end of the shaft 64' has brazed thereon the main burner 71 which is provided along a beveled upper peripheral edge 88 with a plurality of openings 89 through which the mixed fuel gas emits for actual combustion.

The burner 71 is formed of a casting having an annular extension 90 projecting upwardly from the burner proper. This portion 90 is arranged coaxial with the shafts 64—64' and is adapted to be rotatably supported in the ring 43 forming a part of the supporting frame for the refractory partition 16. The entire burner structure is rotatably arranged within the casing 11 for rotation by the drive shaft 61. It will be noted that the mixing chamber 82 is arranged in the utility compartment 13 where there is always a fresh supply of air for entry into the openings 83 of the chamber 82, and that the burner 71 is positioned closely adjacent the refractory material 16, forming an upper wall of the broiler compartment 15. The partition 14 forming the bottom wall of the compartment 15 has formed therein a central opening 91 having an upstanding flange ring 92.

The third flanged casting 86 has formed thereon a conical shaped boss 93 which surrounds the tubular shaft 64'. A tri-spoked casting or spider 94 having a hub formation 95 with an interior conical shaped opening 96 complementary to the boss 93 is adapted to fit upon the latter to constitute a friction drive for a circular grille plate 97 which is adapted to be carried by the spider 94. The grille plate 97 is preferably a casting having a series of radially disposed spoke elements 98 joined at their outer ends to an annular ring 99 and at their inner ends to a central ring and collar 100 providing a central opening substantially greater in diameter than the outer diameter of the burner 71. The inner wall of the collar 100 is provided with spaced lugs 101 adapted to interlock with the outer ends of the spokes 94' on the spider 94 and to rest upon a horizontal flange 94" of such spokes. The foregoing structure is arranged in a horizontal plane just above the lower wall 14 of the broiler chamber 15 so as to be accessible through the openings R', M', W' and E' and is typical of the construction of other rotatable grille plates in the device as shown in Fig. 8. Another such grille 97 and spider 94 assembly is arranged on a friction cone 93' which is fixed by means of a set screw to the tubular shaft 64' immediately below the burner 71 to support a rotatable grille 97 for access through openings R, M, W, and E with respect to the reflector plate 16 to attain the full benefit of heat reflected therefrom.

A plurality of grille plates 97 are rotatably arranged in the preheating chamber, each of them being accessible through the opening 29 and having support on a spider 94 which in turn is frictionally coupled to a drive cone 93". These drive cones 93" are fixedly arranged on a shaft 64" which is in axial alignment with the shafts 64 and 64' and which shaft 64" has at its lower end a square coupling key 103 in a square opening 104 formed in the extension 90 on the burner 71. The upper end of the shaft 64" is rotatably supported in a bearing 105 supported by radially extending legs 106 which rest upon the upper edge of the stack collar 55 (see Fig. 1). By this arrangement all of the grille plates 97 are rotatable with the drive shafts 64—64' and 64" and anything carried by these grille plates 97 will likewise rotate therewith.

On each of the collars 100 of the broiler compartment grille plates 97 there is arranged an annular ring 102 which rings as will be noted in Fig. 1 form a stack or air passage A communicating with the utility compartment 13 and the burner 71 so as to supply oxygen to the place of combustion and thus eliminate the danger of monoxide gas being generated or storing up within the cooking and preheating chambers. The grille plates in the latter chamber 17 are likewise provided with annular rings 102' but these normally form a baffle tending to keep the hot air out in that area of the grilles 97 where the carrying of articles is accomplished; rising hot air currents finally exiting through the stack 56 where a constant draft is maintained assuring a circulation from the bottom to the top of the device.

The outside of the casing 11 is provided with suitable counters or shelving, as 107 arranged below the lowermost openings to the broiler compartment 15 and suitably supported on brackets (not shown). This shelf 107 may be termed a loading platform as distinguished from a discharge station which comprises a pair of superimposed shelves 109 and 110. The discharge shelf 109 is arranged in the same horizontal plane as the lowermost grille plate 97 in the broiler chamber 15 while the shelf 110 is in the same horizontal plane as the uppermost one of the grille plates 97 in that chamber.

As is best illustrated in Figs. 1 and 2, there is provided an ejector disc 111 at each of the levels of the shelves 109 and 110, which discs are keyed as at 112 to the auxiliary drive shaft 69 which normally rotates in a direction opposite to the direction of rotation of the grille 97 as is indicated by the arrows in Fig. 2. The ejector disc 111 rotates anticlockwise (Fig. 2) with one half of the ejector discs 111 being disposed to pass through the opening E or E'; as the case may be, the frame 36 to such openings being provided with a horizontal slit or opening 113 to permit passage of the opposite half of such discs 111 into the broiler chamber 15.

At the commencement of a cooking period the valve 73 is turned on and the fuel emitting from burner 71 ignited. A second or auxiliary burner 116 is arranged in an arcuate slot 117 formed in the partition 14 and on spaced straps 117' arranged thereon which burner 116 is under the control of a separate valve 116' on the instrument panel 74. Both of the burners 71 and 116 being ignited and a number of empty casseroles 115 having been deposited in the upper or preheating chamber 17, the motor 58 is turned on by means of an electric switch 118 on the panel 74 thereupon the shaft 64 will be rotated and with it the burner 71 as well as the grille plates 97. When the interior of the casing 11 reaches a desired heat, for best results usually 400° F. in the preheating chamber 17, and approximately 700° F. in the broiler compartment 15, the device is in readiness for cooking operation.

For the broiling operation, attention is directed to Fig. 7, wherein there is illustrated a casserole 115 with steak therein and positioned beneath the refractory wall 16. It being remembered that the burner 71 and grille 97 are constantly rotating in a clockwise direction it will be noted that the thoroughly consumed fuel gas casts a flame commingling with air rising from the air shaft A, both along side of the burner 71 as well as through the spaced openings 71' in the burner, assuring a complete combustion and an elimination of monoxide gases. The heat from this flame strikes the lower wall of the refractory material 16 and is reflected along lines substantially as indicated by the dot-dash lines and arrows down upon the slowly moving casserole and steak.

As the casserole with steak therein reaches the ejector disc 111 it rides upon the disc 111 and will be conveyed through the exit E onto the discharge shelf 110 where it may be immediately removed together with the hot casserole for serving.

In accordance with ordinances prevalent in local communities the present device is constructed so that the burner structure may be readily removed for inspection and cleaning. As was heretofor explained in view of Figs. 1 and 5, the burner 71 is centrally mounted within the casing 11. In order to remove the burner 71 the bolts at the flanges 79—81 are unscrewed and the entire shaft 64' raised up, including the spiders 94 and the grilles 97. The grilles in the preheating chamber are rested on blocks (not shown) as are the grilles 97 in the broiler chamber. The shaft 64' with the burner head 71 can then be lowered as a unit including the spiders 94 which are now detached from engagement with the ring 100 and the lugs 101 thereon. In its downward or withdrawal movement the burner unit is tilted with the Venturi casting offset from the main drive shaft 64 until the burner head 71 passes below the opening 91 formed in the wall 14 which divides the chambers 13 and 15 from each other.

The burner assembly may then be easily removed from the utility chamber for inspection as well as for the purpose of washing and cleaning the burner. It will be noted that the tubular shaft 64 may be removed from the T connection and the pipe P and its associated parts readily removed.

The auxiliary burners 116 may likewise be removed by sliding them, one at a time, circumferentially with respect to the arcuate slot 117 and then dropping them down into the utility compartment.

The reassembly of these various burners may be accomplished by a reversal of the foregoing detachment operation.

It will be noted that I have provided a novel rotary burner capable of rotatable movement with a common drive in turn capable of supporting for rotation therewith a number of grille plates upon which articles to be cooked are carried. Also that such rotary burner is easily dismantled and removed from the cooker body by reason of a novel arrangement of parts.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having thus described my invention, what I claim as new and desire to protect by Letters Patent is:

1. In a burner for a cooker having a casing and means therein for rotatably supporting a centrally disposed shaft, a burner structure comprising in combination a hollow shaft rotatably mounted in said casing for rotation relative thereto, a burner head arranged on said shaft for movement therewith, said hollow shaft comprising a conduit to convey fuel to said burner, said hollow shaft being provided with openings in the region of its midsection, a sleeve connection surrounding said shaft in the region of said openings and adapted to permit rotative movement of the shaft as aforesaid, fixed conduit means connected to a fuel supply line, said sleeve connection having communication with said fixed conduit means to convey incoming fuel to said openings for transmittal through the hollow shaft to the burner, and drive means operatively connected to said shaft for imparting rotative movement to the latter.

2. In a burner for a rotary cooker the combination of a vertically disposed drive shaft, a hollow shaft connected to said drive shaft for rotation therewith, a fuel gas supply, sleeve means connecting said hollow shaft to said fuel supply, a second hollow shaft in alignment with said first named hollow shaft and coaxial with respect thereto, a burner head on said second named shaft and having a journal formation thereon for rotatably journalling said burner in the rotary cooker, and coupling means connecting said hollow shafts and forming a mixing chamber for combustibly mixing air with fuel gas conveyed to said burner.

3. In a burner for a rotary cooker the combination of a vertically disposed drive shaft, a hollow shaft connected to said drive shaft for rotation therewith, a fuel gas supply, sleeve means connecting said hollow shaft to said fuel supply, a second hollow shaft in alignment with said first named hollow shaft and coaxially with respect thereto, a burner head on said second named shaft and having a journal formation thereon for rotatably journaling said burner in the rotary cooker, and coupling means connecting said hollow shafts and forming a mixing chamber for combustibly mixing air with fuel gas conveyed to said burner, said coupling means comprising a medial casting having open side walls, a lower casting having an orifice formed therein and being attached to the upper end of said first named hollow shaft, and an upper casting having a Venturi tube formed therein and being attached to the lower end of said second named hollow shaft.

4. In a burner for a rotary cooker the combination of a vertically disposed drive shaft, a hollow shaft connected to said drive shaft for rotation therewith, a fuel gas supply, sleeve means connecting said hollow shaft to said fuel supply, a second hollow shaft in alignment with said first named hollow shaft and coaxially with respect thereto, a burner head on said second named shaft and having a journal formation thereon for rotatably journaling said burner in the rotary cooker, and coupling means connecting said hollow shafts and forming a mixing chamber for combustibly mixing air with fuel gas conveyed to said burner, said coupling means comprising a medial casting having open side walls, a lower casting having an orifice formed therein and being attached to the upper end of said first named hollow shaft, and an upper casting having a Venturi tube formed therein and being attached to the lower end of said second named hollow shaft and means connecting said upper and lower castings to said medial casting and permitting facile disassembly of said burner for removal from the rotary cooker.

SIDNEY DAWSON.